US011853068B1

(12) United States Patent
Agarwal et al.

(10) Patent No.: US 11,853,068 B1
(45) Date of Patent: Dec. 26, 2023

(54) VEHICLE TRAJECTORY CONTROLLER SAFETY MARGIN

(71) Applicant: Zoox, Inc., Foster City, CA (US)

(72) Inventors: Kshitij Agarwal, Redwood City, CA (US); Andrew Scott Crego, Foster City, CA (US); Gonzalo Javier Rey, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 241 days.

(21) Appl. No.: 16/389,858

(22) Filed: Apr. 19, 2019

(51) Int. Cl.
  *G05D 1/02* (2020.01)
  *G05D 1/00* (2006.01)
  *B60W 30/10* (2006.01)
  *B60W 50/00* (2006.01)

(52) U.S. Cl.
  CPC ........... *G05D 1/0214* (2013.01); *B60W 30/10* (2013.01); *G05D 1/0088* (2013.01); *B60W 2050/0031* (2013.01); *G05D 2201/0213* (2013.01)

(58) Field of Classification Search
  CPC .............. G05D 1/0214; G05D 1/0088; G05D 2201/0213; G05D 1/0212; G05D 1/0248; G05D 1/0246; B60W 30/10; B60W 2050/0031
  See application file for complete search history.

(56) References Cited

U.S. PATENT DOCUMENTS

| | | | |
|---|---|---|---|
| 2013/0041549 A1* | 2/2013 | Reeve | G05D 1/0278 701/28 |
| 2015/0081156 A1* | 3/2015 | Trepagnier | G05D 1/0248 701/26 |

* cited by examiner

*Primary Examiner* — Rachid Bendidi
*Assistant Examiner* — Andrew J Cromer
(74) *Attorney, Agent, or Firm* — Lee & Hayes, P.C.

(57) ABSTRACT

Techniques for determining a safety margin by which to limit trajectory(ies) generated by a vehicle control system such that the vehicle will not exceed the safety margin more than a target occurrence rate. The techniques may include determining a first spectrum associated with trajectory data generated by one or more vehicles, generating a model of a vehicle, and determining a spectrum of an error signal based at least in part on the model and the first spectrum. Determining the safety margin may be based at least in part on the spectrum of the error signal and a target occurrence rate. Operation characteristics of components of the vehicle (e.g., controller, steering actuator) may be tuned based at least in part on the model, first spectrum, and/or second spectrum. The techniques enable determining safety margins for untested vehicles and/or for different operating states of a vehicle.

20 Claims, 6 Drawing Sheets

US 11,853,068 B1

VEHICLE TRAJECTORY CONTROLLER SAFETY MARGIN

BACKGROUND

A vehicle may use a controller to generate commands for controlling actuator(s) and/or drive component(s) of the vehicle. The controller may receive a reference trajectory from a computing system of the vehicle and generate these commands based at least in part on the reference trajectory. For example, the reference trajectory may indicate a velocity, steering angle, and/or steering angle rate to be accomplished by the vehicle. However, the actual trajectory achieved by the vehicle, in implementing the commands, may differ from the reference trajectory. The amount by which the actual trajectory and the reference trajectory differ is an error. This error may be caused by delays of the controller, actuator(s), and/or drive component(s), dynamics of the vehicle, etc. Depending on the magnitude of the error, the error may result in suboptimal performance of the vehicle and/or in collision with an object in the environment surrounding the vehicle.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
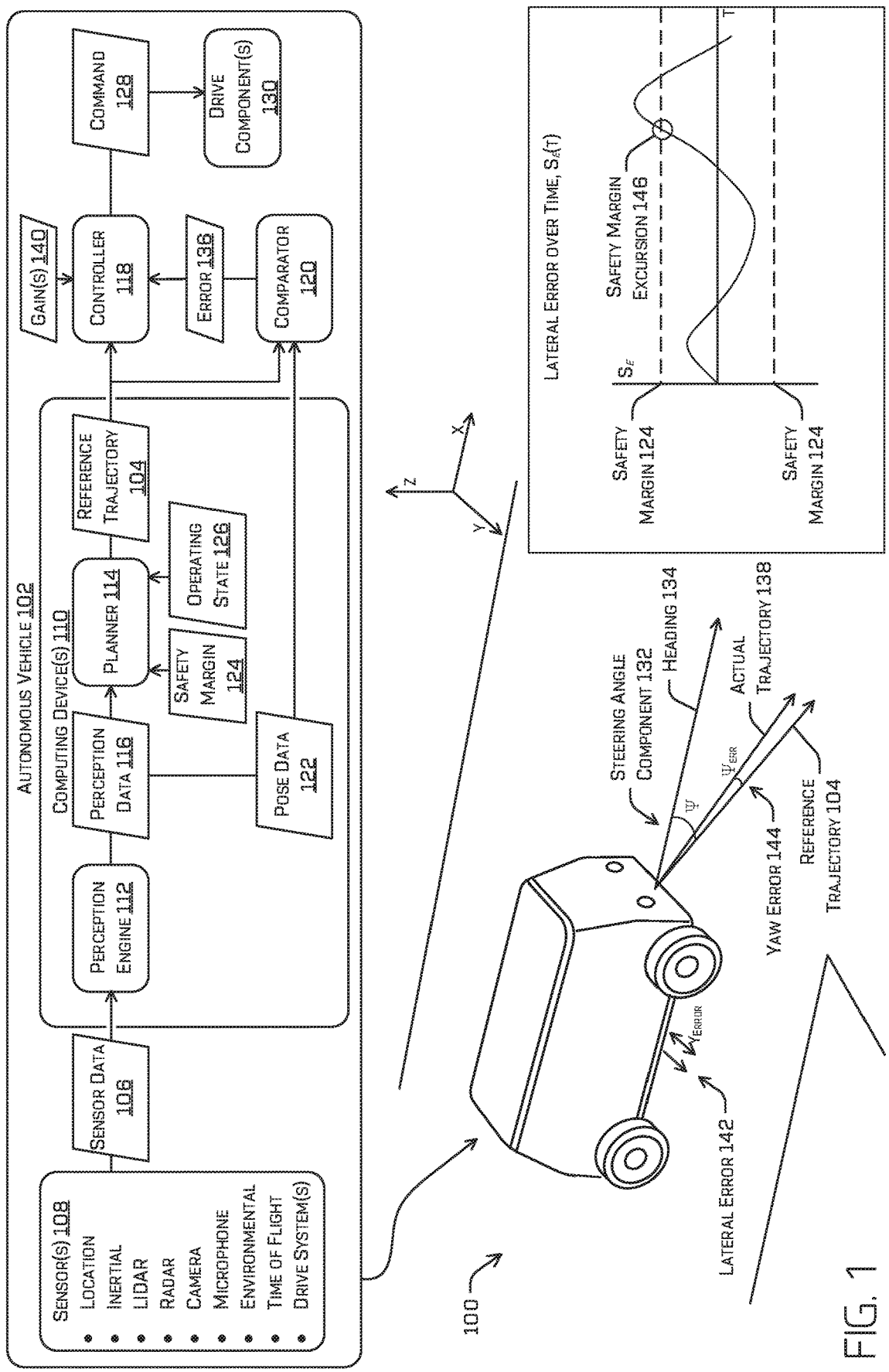
FIG. 1 illustrates an example scenario depicting an autonomous vehicle comprising a control system for generating trajectories according to a safety margin.

The techniques discussed herein generally relate to determining a safety margin by which to limit a reference trajectory generated by computing device(s) of a vehicle's control system. In some examples, the computing device(s) of the vehicle may comprise one or more machine-learning (ML) models trained to receive sensor data from one or more sensors of the vehicle and detect and/or track objects in an environment of the vehicle, localize the vehicle within the environment, and/or generate a reference trajectory for controlling operation of the vehicle. The one or more ML models may output the reference trajectory to a controller which may comprise a proportional controller, a proportional-integral-derivative (PID) controller, and/or the like. The controller may determine, based at least in part on the reference trajectory, a command to track the reference trajectory and which the controller transmits to one or more actuators of the vehicle. The actuators may comprise a power-steering motor and/or other components that convert the command into a force applied to drive component(s) of the vehicle such as, for example, a steering rack, wheels, and/or such similar component(s).

In some examples, the safety margin may be the closest distance the vehicle would be to an object in the environment surrounding the vehicle if the vehicle perfectly implemented the reference trajectory. An actual trajectory that matches the reference trajectory would be a perfect implementation of the reference trajectory—there would be no error between the actual trajectory and the reference trajectory. In other words, the safety margin may define a limit on how close a side of the vehicle would be to another object if the vehicle perfectly implemented the reference trajectory.

In some examples, the vehicle may comprise a front and a back, which may lie along a longitudinal axis of the vehicle, orthogonal to a lateral axis of the vehicle. The safety margin may define a lateral distance (e.g., a distance along the lateral axis of the vehicle) and the techniques discussed herein may regard controlling lateral motion of the vehicle. For example, the reference trajectory may comprise a longitudinal component, such as a longitudinal velocity, and/or a lateral component which may be derived from the longitudinal velocity and a steering angle and/or steering rate (and/or a path curvature and/or yaw rate of a reference trajectory) defined by the reference trajectory. Similarly, the error signal and/or the actual trajectory may comprise respective lateral components.

The techniques discussed herein may additionally or alternatively comprise determining the safety margin in association with an occurrence rate that indicates a number of times that the vehicle will violate the safety margin within a given time period.

In some examples, the techniques may comprise determining a safety margin for any vehicle without needing to measure the error directly and/or without real-world operation of the vehicle for which the safety margins are calculated, although it is contemplated that real-world operation of the vehicle may be used. The techniques may comprise determining a spectrum associated with reference trajectories output by the computing device over time (e.g., comprising a reference trajectory signal), a characterization of the controller, and/or a characterization of the actuator(s) and/or drive component(s). The error signal may be determined by applying the spectrum of the reference trajectory signal to the characterization of the controller and/or the characterization of the actuator(s) and/or drive component(s). For example, the spectrum of the reference trajectory signal may comprise a representation of spectral components of the reference trajectory such as, for example, a power spectral density of the reference trajectory signal. The spectrum may comprise frequencies associated with one or more the reference trajectories.

In some instances, the techniques may determine the characterization of the controller and/or the characterization of the actuator(s) and/or drive component(s) based at least in part on system identification analysis. The characterization(s) of the controller, the actuator(s), and/or the drive component(s) are referred to herein, collectively, as a model of the vehicle system. In some examples, the techniques may comprise generating a model of the vehicle system for different operating conditions of the vehicle system, as discussed in more detail below. In some examples, the techniques may comprise evaluating up to all possible combinations of operation states associated with operating the autonomous vehicle with or without real-world testing.

In some examples, the reference trajectory signal may be generated by operating a vehicle and/or a simulated vehicle using reference trajectories generated by the computing device(s) and storing the reference trajectories in a log. This may comprise receiving real-world sensor data and/or simulating sensor data and providing the real-world and/or sensor data to the one or more ML models of the computing device(s). In some examples, the vehicle controlled by the computing device(s) may be a same or a different type as the vehicle for which the safety margin may be calculated. The techniques may comprise generating the reference trajectory signal by removing reference trajectories indicating a velocity less than a threshold velocity (e.g., less than 0.5 mph, less than 2 mph) so that trajectories generated by the computing device(s) for controlling the vehicle to remain stopped won't unduly influence the spectrum of the reference trajectory signal. The safety margins may not apply while the vehicle is stopped. Accordingly, removing the component of the spectrum that is attributable to "stay stopped" reference trajectories may result in determining a safety margin that achieves an actual excursion occurrence rate that is closer to the theoretical occurrence rate for which the safety margin was determined.

Once the techniques determine a spectrum of the reference trajectory signal and generate a model of the vehicle system, the techniques may comprise determining the error signal and/or a spectrum of the error signal based at least in part on the spectrum and the model. In some examples, the techniques may determine a safety margin by solving a level-crossing equation for the safety margin based at least in part on evaluating the level-crossing equation at the error signal, a variance of the error signal, and/or the occurrence rate.

In some examples, the techniques discussed herein may additionally or alternatively determine different safety margins for different operation states. For example, an operation state may comprise an operating parameter and/or operating condition. An operating parameter may comprise one or more variables that are affected by the commands of the controller, whereas an operating condition may comprise a variable that is not affected by a command of the controller.

In some examples, determining different safety margins for different operating states may comprise generating a model for different operating parameters and/or operating conditions. For example, the model may comprise a first transfer function that accounts for wheel dynamics, which may change depending on the slipperiness of the surface upon which the vehicle is operating, and/or the model may comprise a component that accounts for a longitudinal velocity and/or lateral acceleration of the vehicle.

In some examples, the controller and/or the actuator(s) may comprise a set of gains (e.g., a proportional gain, integral gain, derivative gain). In some examples, one or more of these gains may be set in firmware and/or software of the component. The techniques discussed herein may comprise determining a set of gains for the controller and/or actuator(s) that reduces a magnitude of the safety margins. For example, the techniques may comprise generating different models of the vehicle system with different sets of gains, determining different candidate safety margins associated therewith, and/or selecting final safety margin from among the candidate safety margins, where the final safety margin may be associated with a (final) set of gains. Determining the final safety margin and/or the final set of gains may be based at least in part on a Monte Carlo method, and/or any other suitable simulation method for identifying a combination of safety margin and gain values that satisfy a target (e.g., the target may be reducing a magnitude the safety margins; increasing a perceived smoothness of operation, which may include reducing the gains; a combination thereof; and the like). In some examples, the techniques may comprise transmitting the final set of gains and/or the final safety margin to one or more autonomous vehicles of a fleet of autonomous vehicles and/or instructions to update firmware and/or software of the one or more autonomous vehicles so that a control system of the one or more autonomous vehicle will control operation of the autonomous vehicles according to the final set of gains and/or the final safety margin.

In some examples, the techniques may comprise generating a first model for a first vehicle that was operated in a simulation and/or in the real-world and determining a first spectrum for reference trajectory data generated by the first vehicle during operation in the simulated and/or real-world environment. The techniques may additionally or alternatively comprise generating a second model for a second vehicle that is different than the first vehicle. In some examples, the second vehicle may or may not yet exist (or at least be fully-assembled). The techniques discussed herein may comprise determining a safety margin, gain(s), and/or error signals associated with the second vehicle based at least in part on the first spectrum and the second model.

The techniques discussed herein may comprise verifying a quality and/or suitability of a component of the vehicle system based at least in part on conducting a system identification analysis of the component and comparing a resultant characterization of the component to a characterization of the component associated with a previously-generated model. In this manner, the techniques may comprise identifying a faulty and/or non-conformant component (e.g., a non-conformant component may be associated with a transfer function that causes an estimated occurrence rate to meet or exceed the occurrence rate for which a safety margin was calculated). For example, the techniques may verify that an actual transfer function associated with the second vehicle is within a threshold difference of the second model.

In additional or alternate examples, the techniques may comprise determining, based at least in part on a characterization, an error contribution of a component. The techniques may comprise populating a user interface with a suggestion of a component to modify and/or exchange based at least in part on an error contribution associated with the component. For example, the techniques may identify a steering rack as having an impulse response and/or being associated with a transfer function indicative of a delay that contributes to the overall error. The steering rack may be substituted for a different kind of steering rack having a different impulse response and/or transfer function, the steering rack itself may be tuned, and/or a gain associated with an actuator that exerts force upon the steering rack may be modified to decrease the delay. In some examples, the techniques may comprise indicating an error contribution of different components of a vehicle system and/or representing an order of the components according to error contribution.

The techniques discussed herein may increase the safety and/or efficiency of a vehicle that uses the safety margins and/or gains determined by the techniques. In some examples, the techniques may additionally or alternatively be implemented without needing a significant amount of real-world operation of the vehicle. For example, the model of an autonomous vehicle may be obtained based at least in part on simulation and/or piecemeal system identification analysis by the spectrum of a reference trajectory signal is obtained; the reference trajectory signal may be obtained based at least in part on real-world and/or simulated operation of any vehicle by the computing device(s). The techniques may also enable remote tuning of operation of one or more autonomous vehicles of a fleet of autonomous vehicles.

Example Scenario

FIG. 1 illustrates an example scenario 100 including an autonomous vehicle 102 comprising a control system for controlling motion of the autonomous vehicle 102 according to a reference trajectory 104. In some instances, the autonomous vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 102 may be a fully or partially autonomous vehicle having any other level or classification. It is contemplated that the techniques discussed herein may apply to more than robotic control, such as for autonomous vehicles. For example, the techniques discussed herein may be applied to manufacturing, mining, boring/tunneling, medical devices, etc. Moreover, even though the autonomous vehicle 102 is depicted as a land vehicle, autonomous vehicle 102 may be a spacecraft, watercraft, and/or the like.

According to the techniques discussed herein, the autonomous vehicle 102 may receive sensor data 106 from sensor(s) 108 of the autonomous vehicle 102. In some examples, the sensor data 106 may be received at computing device(s) 110. For example, the sensor data 106 may include a location signal (e.g., a GPS signal), an inertia signal (e.g., an accelerometer signal, a gyroscope signal, etc.), a magnetometer signal, a wheel encoder signal, a speedometer signal, point cloud(s) of accumulated LIDAR, radar, ToF, depth camera, and/or other depth-sensing sensor points, an image (or images), an audio signal, a feedback signal from one or more components of the control and/or drive system(s), and/or bariatric and/or other environmental signals, etc.

In some examples, the computing device(s) 110 may include a perception engine 112 and/or a planner 114. In general, the perception engine 112 may determine what is in the environment surrounding the autonomous vehicle 102 and the planner 114 may determine how to operate the autonomous vehicle 102 according to information received from the perception engine 112 regarding the environment.

The perception engine 112 may receive sensor data 106 from sensor(s) 108 of the autonomous vehicle 102 and determine perception data 116 based at least in part on the sensor data 106. In some examples, the perception engine 112 may include one or more ML models and/or other computer-executable instructions for detecting, identifying, segmenting, classifying, and/or tracking objects from sensor data 106, all or part of which may be at least part of the perception data 116. In some examples, perception data 116 may comprise a detection of a failure condition (e.g., blown tire, failed tie rod), which may be part of the operation state.

In some instances, the perception engine 112 may additionally or alternatively determine a position of the autonomous vehicle 102 determined by a localization engine (not pictured, which may use any sensor data to localize the autonomous vehicle 102), data related to objects in the vicinity of the autonomous vehicle 102, route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. The data produced by the perception engine 112 may be collectively referred to as "perception data."

Once the perception engine 112 has generated the perception data 116, the perception engine 112 may transmit the perception data 116 to the planner 114, controller 118, and/or comparator 120. For example, transmitting the perception data 116 may comprise publishing the perception data 116 over a publisher-subscriber (pub/sub) network, where any of the planner 114, controller 118, and/or comparator 120 may subscribe to publications of perception data 116, or portions thereof, from perception engine 112.

In some instances, the planner 114 may receive perception data 116. In some examples, the planner 114 may comprise one or more ML models. The ML models discussed herein may include a neural network, such as a random forest and/or boosted ensemble of decision trees; a directed acyclic graph (DAG) (e.g., where the nodes are organized as a Bayesian network); deep learning algorithm(s), such as artificial neural networks (ANN) (e.g., recurrent neural network (RNN), residual neural network (ResNet)), deep belief network (DBN), deep stacking network (DSN); etc.

The planner 114 may generate instructions for controlling operation of the autonomous vehicle 102 based at least in part on the perception data 116. For example, the planner 114 may determine a route for the autonomous vehicle 102 from a first location to a second location and generate, based at least in part on the perception data 116 and substantially simultaneously, a plurality of potential trajectories for controlling motion of the autonomous vehicle 102 in accordance with a receding horizon technique (e.g., 1 micro-second, half a second) to control the vehicle to traverse the route (e.g., in order to avoid any of the detected objects represented in the perception data 116, as well as incorporate predictions of where such objects may be at points in the future, while accounting for a current and/or predicted position of the autonomous vehicle, etc.). The planner 114 may select one of the potential trajectories as a reference trajectory 104.

In some examples, the planner 114 may additionally or alternatively generate the potential trajectories and/or select the reference trajectory 104 based at least in part on a safety margin 124 and/or an operating state 126 associated with the autonomous vehicle 102. For example, the planner 114 may generate the potential trajectories such that none of the potential trajectories violate the safety margin 124 and/or the planner 114 may select the reference trajectory 104 from among the potential trajectories based at least in part on determining that the reference trajectory 104 does not violate the safety margin 124.

Figure 2:
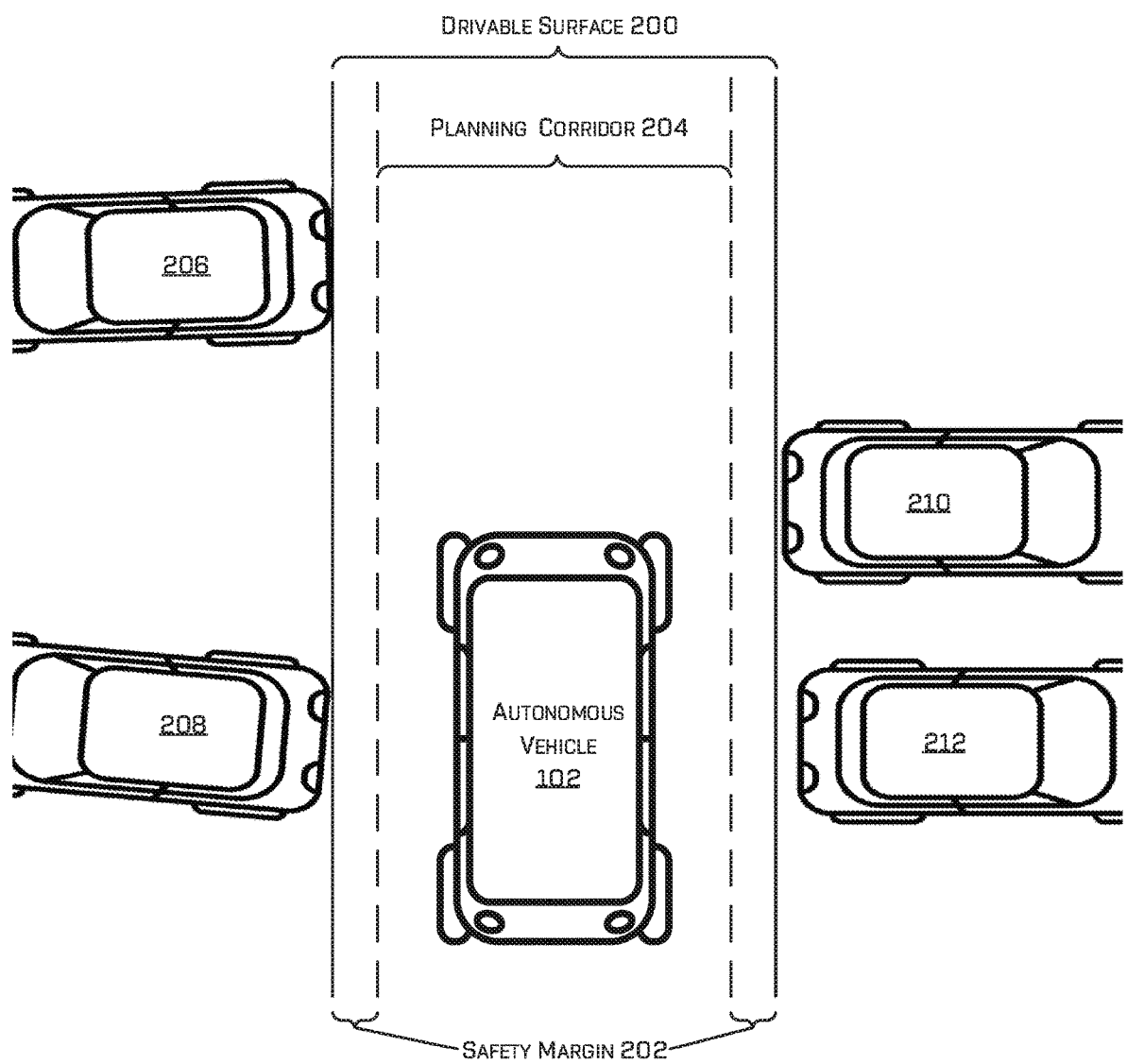
FIG. 2 illustrates an aerial view of an example drivable surface, safety margin, and planning corridor.

FIG. 2 illustrates an aerial view of autonomous vehicle 102 operating on an example drivable surface 200 based at least in part on a safety margin 202 and/or planning corridor 204. For example, autonomous vehicle 102 may be operating in a parking lot including object 206-212 (e.g., various parked vehicles). In some examples, the perception data 116 may indicate that drivable surface 200 is "free" in that the depicted portion of the drivable surface is unoccupied by other objects and may therefore be used by the autonomous vehicle for presumably collision-free operation. The safety margin 202 may represent a safety margin 124 determined according to the techniques discussed herein. As depicted, although drivable surface 200 may be "free" of other objects, safety margin 202 reduces the effective planning corridor from the entirety of the "free" drivable surface 200 to a subset thereof, i.e., planning corridor 204. The planner 114 may generate the potential trajectories such that none of the potential trajectories having any portion thereof lying outside the planning corridor 204 and/or the planner 114 may select the reference trajectory 104 from among the potential trajectories based at least in part on determining that no portion of the reference trajectory 104 lies outside planning corridor 204.

Returning to FIG. 1, in some examples, an operating state 126 may comprise an operating parameter and/or operating condition. An operating parameter may comprise one or more variables that are affected by a command 128 generated by the controller 118 such as, for example, a longitudinal velocity, a longitudinal acceleration, a lateral velocity, lateral acceleration, yaw rate, and/or path curvature associated with the autonomous vehicle 102. Whereas, an operating condition may comprise a variable that is not affected by a command 128 of the controller 118 such as, for example, a number of passengers in the vehicle, a weight of the vehicle, a grade, bank, and/or kinematic coefficient of a surface upon which the vehicle is operating, a failure condition associated with the vehicle (e.g., worn brakes, brake failure, tie rode broken, worn tire, flat tire), characteristics of one or more components of the vehicle (e.g., how component(s) of the vehicle respond to input, a transfer function of a component), gain(s) associated with the controller and/or actuator(s), an environmental condition (e.g. wind speed, wind direction, precipitation, dew point, humidity), path curvature, etc. In some examples, the perception engine 112 and/or the planner 114 may determine the operating state 126 based at least in part on sensor data 106 and/or perception data 116.

In some examples, the safety margin 124 and/or the operating state 126 may be stored in a memory device of the computing device(s) 110. In some examples, the safety margin 124 and/or the operating state 126 may be stored as a relational database, lookup table, and/or any other data structure comprising a plurality of safety margins associated with different operating states. For example, a first safety margin may be associated with a first operation state defining a first set of operating parameters (e.g., 25 miles-per-hour while maintaining a 0° steering angle) and/or a first set of operating conditions (e.g., snowy road surface, 5% grade); a second safety margin may be associated with a second operation state defining the first set of operating parameters and/or a second set of operating conditions (e.g., dry road surface, 2% grade); a third safety margin may be associated with a third operation state defining a second set of operating parameter (e.g., 15 miles-per-hour while increasing steering angle by 0.5° per second) and/or the second set of operating conditions; and so on.

In some examples, the techniques discussed herein may comprise determining a safety margin for use by the planner 114 by interpolating between safety margin(s) and/or operating state(s) stored in the memory. The techniques may additionally or alternatively comprise determining a maximum safety margin based at least in part on sensor data 106 and limiting an operating parameter based at least in part on the maximum safety margin. For example, the perception engine 112 may indicate that a maximum driving surface width is reduced (perhaps due to an object in the road or an accident). The planner 114 may determine a maximum safety margin that would allow the autonomous vehicle 102 to pass over the driving surface (at its narrowest point) without violating a safety margin and may constrain an operating parameter according to the maximum safety margin. For example, this may comprise reducing a velocity of the autonomous vehicle 102 so that the safety margin shrinks to fit the maximum safety margin.

In some examples, the planner 114 may determine, based at least in part on perception data 116 and/or sensor data 106, an operating state 126 from among a plurality of operating systems, to identify as a current operating state. The planner 114 may identify a safety margin 124 associated with the current operating state. The planner 114 may use this safety margin 124 to generate the potential trajectories and/or to select the reference trajectory 104 from among the potential trajectories.

In some examples, the safety margin 124 may define a spatial limit on how close a side of the vehicle would be to another object if the vehicle perfectly implemented the reference trajectory 104 (to achieve a certain occurrence rate). For example, the safety margin 124 may be a distance, e.g., 0.2 meters, 1 meter, 1 foot, and/or the like. In some examples, the safety margin 124 may comprise a lateral distance, e.g., a distance from a lateral side of the vehicle. A "violation" of the safety margin 124 may include any time at which at least a portion of the autonomous vehicle 102 comes within less than the safety margin 124 of another object. For example, if the safety margin is 0.18 meters, if any portion of a side of the vehicle comes within less than 0.18 meters of another object, the safety margin 124 may be considered as being "violated" by the autonomous vehicle 102 for however long the autonomous vehicle 102 was less than 0.18 meters from the object.

In some examples, the techniques discussed herein may comprise determining a probability associated with a fault classification. In some examples, instead of experimentally determining the probability of a fault occurring by operating the autonomous vehicle 102 (potentially for many hours, e.g., thousands, millions, or billions of hours), the probability may be a target occurrence rate indicating a "tolerated" number of times a certain fault are tolerated to occur with a time period.

Different fault classification may be associated with different consequences (relations to the safety margin 124) of the fault classification and a different (target) probability of such an occurrence. For example, a minor fault may comprise a fault that results in being able to maintain (keep the autonomous vehicle 102 from violating) the safety margin 124, a major fault may result in being able to maintain the safety margin 124 for a limited time, and a severe fault may result in violating the safety margin (e.g., the autonomous vehicle 102 may collide with another object).

In some examples, the techniques discussed herein may comprise determining a safety margin 124 (for a particular operating state 126, in some examples), based at least in part on an occurrence rate associated with the severe fault classification (e.g., one time in one billion hours of operation or, equivalently, 10-9 times an hour; one time in one trillion hours of operation; one time in 100 million hours of operation). In such an example, the minor and/or major fault classifications may be based on the safety margin 124 determined for the severe fault classification. Additionally or alternatively, occurrence rates associated with the minor and/or major fault classifications may be based at least in part on the occurrence rate associated with the severe fault classification and/or the safety margin 124.

In some examples, the planner 114 may transmit (e.g., via a pub/sub network) the reference trajectory 104, determined based at least in part on the safety margin 124, to controller 118. The reference trajectory 104 may comprise a target longitudinal velocity, target yaw rate (e.g., yaw degrees per second, rads per second), target yaw angle (e.g., steering yaw to be achieved), and/or path curvature to be achieved by the drive component(s) 130 over a time period (e.g., the time period may correspond to a receding horizon time such as 1 second, 500 millisecond, and the like). For example, a steering angle component 132 of the reference trajectory may identify a yaw from an initial heading 134 to be achieved by controlling the autonomous vehicle 102 based at least in part on the reference trajectory 104.

The controller 118 may generate a command 128 based at least in part on tracking the reference trajectory 104 according to feedback received at the controller 118. For example, comparator 120 may determine difference (error 136) between an actual trajectory 138 accomplished by implementation of command 128 by the drive component(s) 130. In some examples, the controller 118 may comprise a proportional controller, a proportional-derivative-integral (PID) controller, and/or the like. The controller 118 may therefore be associated with gain(s) 140. For example, gain(s) 140 may comprise a proportional gain, a derivative gain, an integral gain, and/or other damping and/or amplifying coefficient(s). In some examples, gain(s) 140 may additionally or alternatively comprise gain(s) associated with actuator(s) of the drive component(s) 130. Gain(s) 140 may control how the controller 118 and/or actuator(s) react to feedback—e.g., how the controller 118 and/or actuator(s) drive the actual trajectory 138 towards matching reference trajectory 104.

The comparator 120 may determine error 136 based at least in part on pose data 122 indicating a position and/or orientation of the autonomous vehicle 102. In some examples, controller 118 comprises comparator 120. In additional or alternate examples, comparator 120 may be a component of the computing device(s) 110.

In some examples, perception data 116 may comprise pose data 120. In some examples, pose data 122 may indicate a position and/or orientation of the autonomous vehicle 102 within the environment. For example, pose data 122 may indicate values of one or more of the six degrees of freedom, i.e, surge ("forward/backward" relative position, corresponding to a longitudinal axis of the vehicle), heave ("up/down" relative position, corresponding to a normal axis of vehicle), sway ("left/right" relative position, corresponding to a lateral/transverse axis of the vehicle), yaw (rotation about the normal axis, traditionally associated with steering a land vehicle left or right), pitch (rotation about the transverse axis), and roll (rotation about the longitudinal axis). In some examples, controller 118 and/or comparator 120 may subscribe to at least publications of a pose data 122 portion of perception data 116.

In some examples, in determining error 136, the comparator 120 may determine one or more components of the error 136. For example, the comparator 120 may determine a lateral error 142 (e.g., a distance along the lateral axis by which the autonomous vehicle is "off" a lateral position perfect implementation of the reference trajectory 104 would result in). The lateral error 142 may be based at least in part on delay(s), non-linearities, wear, and the like of controller 118 and/or drive component(s) 130 resulting in a lateral slip (e.g., of the wheels' contact with the drivable surface) and/or a yaw error 144 that results in lateral error (e.g., by displacement of the vehicle along the erroneous yaw). If a magnitude of the lateral error is great enough it may result in a violation of the safety margin, depicted as safety margin excursion 146 in the graph in the lower right-hand corner of FIG. 1. The graph depicts the lateral error over time, S E (t), and safety margin 124, represented as a positive and negative threshold, respectively, since the safety margin 124 may lie on either side of the autonomous vehicle 102. In some examples, the safety margin 124 may be different for different sides of the vehicle 102 (e.g., where a road surface is banked, causing a rotational force in a roll direction of the autonomous vehicle 102 to be exerted on the autonomous vehicle 102).

In some examples, the command 128 may be received by actuator(s) of the drive component(s) 130, which may be configured to convert the command 128 to a force applied to various components of the drive component(s) 130 such as, for example, a steering rack, wheels, and the like. The type of actuator(s) and/or drive components discussed herein may vary based on the type of craft and/or between different versions of autonomous vehicles, e.g., in the case of spacecraft, the actuator(s) may comprise a valve and/or thruster, whereas for a land craft the actuator(s) may comprise a electronic and/or combustion motor.

Example Process

Figure 3:
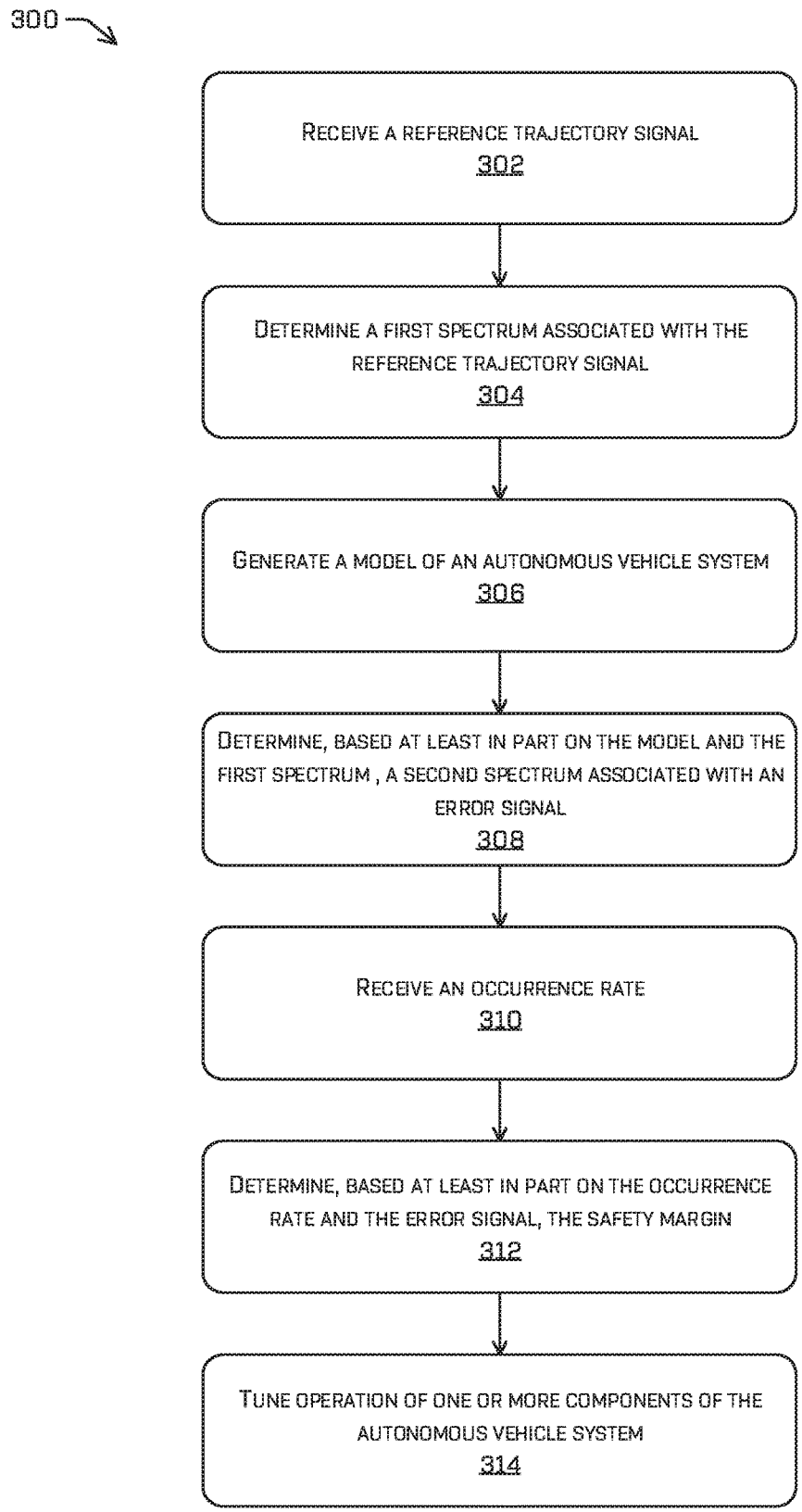
FIG. 3 illustrates a flow diagram of an example process for determining a safety margin.

FIG. 3 illustrates a flow diagram of an example process 300 for determining a safety margin. In some examples, one or more computing devices and/or an autonomous vehicle may be configured to conduct example process 300. For example, the one or more computing devices may include a distributed computing architecture such as a cloud computing system. The one or more computing devices may be communicatively coupled to the autonomous vehicle and/or may receive communication therefrom, although in additional or alternate examples, the one or more computing devices may retrieve data associated with the autonomous vehicle from a memory to which log data was stored in association with the autonomous vehicle.

At operation 302, example process 300 may comprise receiving a reference trajectory signal, according to any of the techniques discussed herein. In some examples, receiving the reference trajectory signal may comprise receiving reference trajectory(ies) from a log file of one or more autonomous vehicles populated by simulated and/or real-world operation of the one or more autonomous vehicles, and/or extracting a yaw rate. For example, a perception engine and/or planner may be provided synthetic sensor data generated according to a simulation and/or sensor data from an autonomous vehicle operating in a real-world environment, and the perception engine and/or planner may perform the functions described herein to generate a reference trajectory.

In some examples, operation 302 may further comprise extracting a steering portion of the reference trajectory, which may include a yaw, yaw rate, and/or path curvature (e.g., since, in some examples, a reference trajectory may comprise a longitudinal velocity, yaw, yaw rate, and/or path curvature). Operation 302 may additionally or alternatively comprise remove 0-speed samples from the collection such as by determining whether the reference trajectory signal indicates a longitudinal velocity that is less than a velocity threshold (e.g., 0.1 miles per hour, 0.5 miles per hour).

In some examples, the techniques discussed herein for determining a safety margin may be conducted for different operating states. Operation 302 may comprise separating reference trajectories associated with different operating states, such as highway and urban driving.

Once all or some of these sub-operations are complete (which may be conducted as part of a same or different operation described herein or in a different order), the reference trajectories may be represented as a reference steering signal, which may indicate a magnitude of a yaw rate, yaw angle, and/or path curvature over time.

At operation 304, example process 300 may comprise determining a first spectrum associated with the reference trajectory signal, according to any of the techniques discussed herein. In some examples, the reference trajectory signal may comprise one or more reference trajectories generated by planner 114. The spectrum may represent frequenc(ies) and/or magnitudes associated with a plurality of steering angles, steering angle rates, yaw rates, path curvature, and/or speeds represented by the reference trajectory signal. For example, the spectrum may represent a magnitude of frequency component(s) of the reference trajectory signal such as, for example, an energy spectral density, power spectral density (e.g., spectral energy per time unit), and/or the like. Simply, in some examples, the spectrum may represent how frequently the planner 114 generated a reference trajectory specifying a particular steering angle and/or steering rate. In an additional or alternate example, operation 304 may represent the reference trajectory signal using any suitable representation that quantifies characteristics/bounds of what reference trajectories may be generated by the planner (e.g., during different operating states). In some examples, finding the power spectral density may comprise determining a fast Fourier transform of the reference trajectory, having a zero mean. In some examples, the fast Fourier transform may be weighted, although, in other examples, the fast Fourier transform may be unweighted. The spectrum of the reference trajectory signal is represented as "$S_R$" in the following discussion.

Figure 4A:
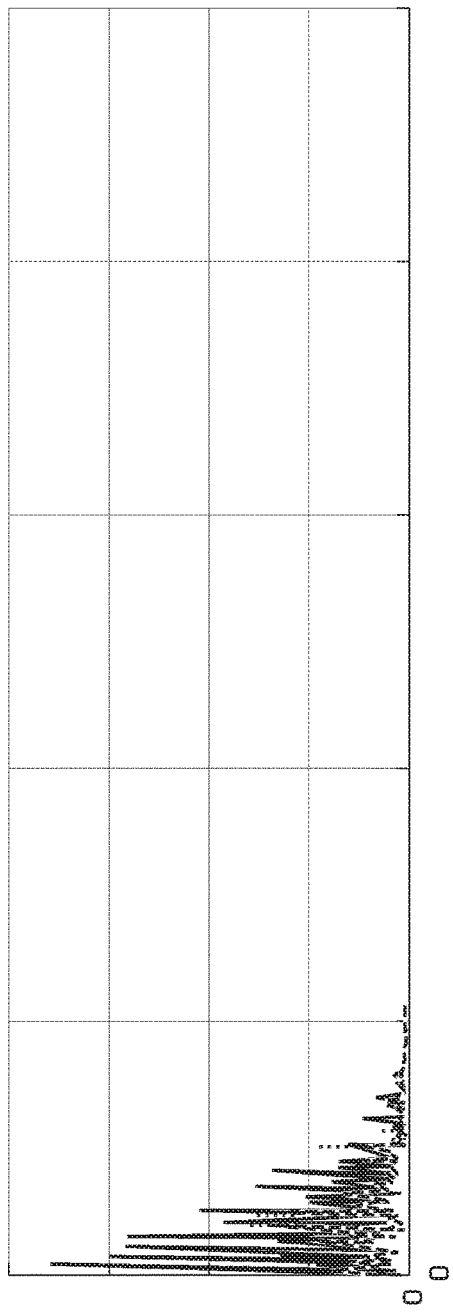
FIG. 4A illustrates a graph depicting a spectral representation ("spectrum") of a reference trajectory signal generated by a planner during urban operation of the vehicle.
Figure 4B:
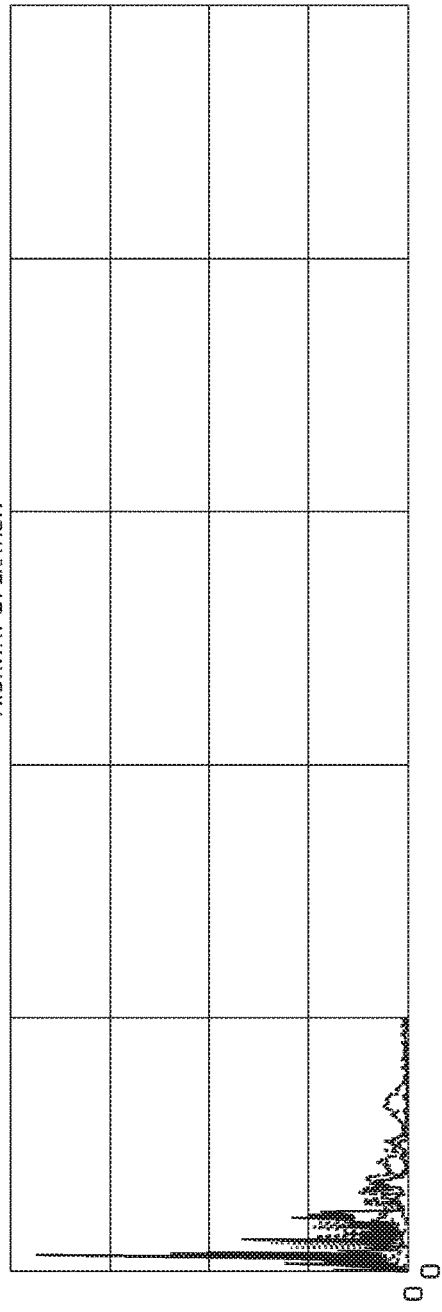
FIG. 4B illustrates a graph depicting a spectral representation ("spectrum") of a reference trajectory signal generated by a planner during highway operation of the vehicle.

FIGS. 4A and 4B illustrate graphs depicting spectrums of a yaw rate of a reference trajectory signal generated for urban operation of the autonomous vehicle and highway operation of the autonomous vehicle, respectively. Specifically, FIGS. 4A and 4B depict power spectral density of the respective signals. Note that the spectrum illustrated in FIG. 4A indicates that the yaw rate component of reference trajectories generated for urban operation has a greater magnitude over a greater spectrum of frequencies (i.e., more power spread over more frequencies), whereas the yaw rate component of reference trajectories generated for highway operation indicate smaller magnitudes at fewer frequencies. Such differences may be due to, for example, an autonomous vehicle conducting more and tighter turns during urban operation than during highway operation.

Returning to FIG. 3, at operation 306, example process 300 may comprise generating a model of an autonomous vehicle system, according to any of the techniques discussed herein. Generating the model of the autonomous vehicle system may comprise determining a characterization of the controller, actuator(s), and/or drive component(s) of the autonomous vehicle. In some examples, determining such a characterization may comprise a system identification analysis. For example, determining a characterization of a component using a system identification analysis may comprise providing an input signal (e.g., a sinusoid, a Dirac-type signal, a sawtooth signal, and/or the like) to the component, measuring an output signal of the component, and determining a transfer function associated with the component based at least in part on the input signal and the output signal. The model is represented as H(s) in the following discussion (note that H(s) may comprise an s-domain function, although H(s) may also be represented in any other domain, such as a time domain and/or frequency domain). In some examples, operation 306 may comprise determining H(s) based at least in part on a Laplace transform of an output signal of one or more components and/or a Laplace transform of difference between the output signal compared to the input signal. In an additional or alternate example, H(s) may comprise a frequency response of one or more components of the autonomous vehicle system. For example, H(s) may comprise a frequency-by-frequency phase response, such as a Bode plot represents. In at least some examples, this may be determined analytically. In additional or alternative examples, this may be determined numerically using such Bode plots.

Figure 5:
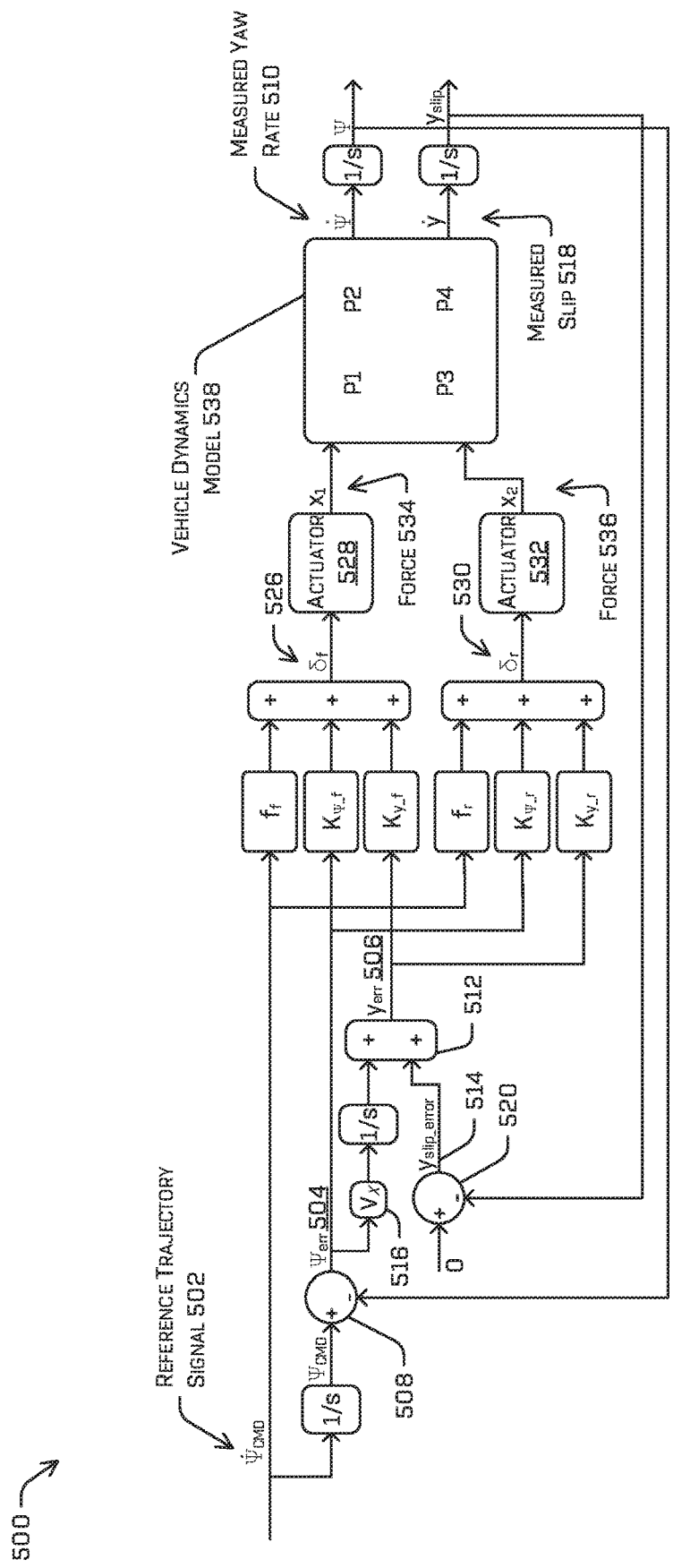
FIG. 5 illustrates an example model of the autonomous vehicle used to determine an error signal and/or spectrum of the error signal.

In some examples, operation 306 may comprise determining a transfer function representing at least a portion of the control system comprising multiple components—i.e., the transfer function may collectively represent the controller, actuator(s), and/or drive component(s). In some examples, the transfer function may comprise a function that maps an input reference trajectory to an error, modeling an error response of the autonomous vehicle to reference trajectory inputs. The model may comprise one or more transfer functions representing different components of the control system and/or drive system such as, for example, a gain of the controller, a feedforward block of the controller, a lag and/or dead band of a component, a steering actuator, a steering rack, brake actuators, motor actuators, vehicle kinematics (e.g. tire interaction with driving surface, engine characteristics, body roll, inertia), and/or the like. FIG. 5 depicts an example model in more detail. Individual transfer functions and/or operations of the model may be combined into one representation/transfer function. In some examples, individual components of the control system may be represented by individual transfer functions and/or the vehicle dynamics may be represented as a single transfer function (e.g., as the plant controlled by the control system).

In some examples, the model may be non-linear. Accordingly, operation 306 may comprise generating a different model for different operating states. For example, operation 306 may comprise generating a first model for a first operation state defining a first set of operating parameters (e.g., 25 miles-per-hour while maintaining a 0° steering angle) and/or a first set of operating conditions (e.g., snowy road surface, 5% grade); a second model for a second operation state defining the first set of operating parameters and/or a second set of operating conditions (e.g., dry road surface, 2% grade); and so on. In some examples, operation 306 may re-use components of the model that may be unchanged by a different operating state. For example, a feedforward component and/or gain of the controller may be unchanged between two different operating states. However, in some examples, the gain(s) and/or feedforward component may be altered for different operating states, therefore the gain(s) and/or feedforward component portion of the model may be altered accordingly.

In an additional or alternate example, the example process 300 may comprise determining a second model for a second vehicle (and/or operating state associated therewith), where the second vehicle is a different vehicle.

At operation 308, example process 300 may comprise determining, based at least in part on the model and the first spectrum, a second spectrum associated with an error signal, according to any of the techniques discussed herein. For example, where the first spectrum comprises a power spectral density of the reference trajectory signal, the second spectrum associated with the error signal may comprise a power spectral density of the error signal. In some examples, the second spectrum, $S_E$, may be determined according to the following equation:

$$S_E = |H(s)|^2 S_R \quad (1)$$

According to Equation 1 the second spectrum of the error signal may equal the magnitude of the model (e.g., transfer function) square multiplied by the first spectrum of the reference trajectory signal. The variance of the error signal, $\sigma_e^2$, may be found by integrating the second spectrum over the frequencies of the second spectrum:

$$\sigma_E^2 = \int_{-\infty}^{\infty} S_E(f) df \quad (2)$$

At operation 310, example process 300 may comprise receiving an occurrence rate, according to any of the techniques discussed herein. The occurrence rate may indicate a number of times that the autonomous vehicle system may violate the safety margin within a time period. The occurrence rate is represented as N in the following discussion.

At operation 312, example process 300 may comprise determining, based at least in part on the occurrence rate and the error signal, the safety margin, according to any of the techniques discussed herein. For example, operation 312 may comprise solving a level-crossing equation for the safety margin, represented as T, such as in the following formulation of Rice's formula:

$$N = \frac{2\beta_E}{\sigma_E} e^{-\frac{1}{2}\left(\frac{T}{\sigma_E}\right)^2} \quad (3)$$

where:

$$\beta_E = \sqrt{\int f^2 S_E(f) df} \quad (4)$$

$$\sigma_E = \sqrt{\int S_E(f) df} \quad (5)$$

In some examples, operation 312 may additionally or alternatively storing the safety margin, e.g., for access by a planner of the autonomous vehicle (whether simulated or not), and/or transmitting the safety margin to one or more autonomous vehicles of a fleet of autonomous vehicles. In some examples, the transmission may comprise instructions to store the safety margin and generate trajectories based at least in part on the safety margin.

In some examples, since the model may be non-linear, operation 312 may additionally or alternatively comprise determining a different safety margin for different operating states of the autonomous vehicle (e.g., based on the different models generated for the different operating states). For example, the table below depicts example safety margins, in meters, for different operating parameters, longitudinal velocity ($V_x$) and lateral acceleration ($A_y$).

TABLE 1

Safety Margins for Respective Different Operating Parameter Values

| Operating Parameter Value | 10 m/s ($V_x$) | 20 m/s ($V_x$) | 30 m/s ($V_x$) |
|---|---|---|---|
| 1 m/s² | 0.1 m | 0.3 m | 0.5 m |
| 3 m/s² | 0.4 m | 0.55 m | 0.9 m |
| 5 m/s² | 1.5 m | 2.5 m | 3.5 m |

For simplicity, Table 1 only depicts two different operating parameters. In some examples, operating states may comprise operating conditions and/or operating parameters. It is understood that operation 312 may generate a three-or-more dimensional relational database comprising different safety margins for different operation states. A safety margin may be determined in association with an operating state specifying an operating parameter and/or operating condition. For example, if the autonomous vehicle determines that a tire blew out, the autonomous vehicle may determine, from the relational database, a safety margin associated with operating while the autonomous vehicle has a flat tire.

In some examples, a computing device may transmit the relational database to one or more autonomous vehicles of a fleet of autonomous vehicles. To use a safety margin, an autonomous vehicle may determine an operation state and a safety margin corresponding therewith from the relational database and use the safety margin to determine a trajectory for controlling the autonomous vehicle. In some examples, an autonomous vehicle may detect, based at least in part on sensor data, a failure condition (e.g., blown tire, failed tie rod), which may be part of the operation state.

In some instances, example process 300 may additionally or alternatively comprise operation 314. Operation 314 may comprise tuning operation of one or more components of the control system and/or drive system(s), according to any of the techniques discussed herein. Operation 314 may comprise testing different gain(s) associated with one or more components of the control system. For example, the controller may comprise one or more gains (e.g., proportional gain(s), integral gain(s), derivative gain(s), and/or other damping or amplifying coefficients) and/or the actuator(s) (e.g., brake actuators, steering actuators) may be associated with one or more gain(s). Operation 314 may comprise causing generation of different models associated with different combinations of gains and determining different safety margins associated therewith. For example, operation 314 may comprise a Monte Carlo method to identify a set of gain(s) that satisfies a target function. The target function may indicate a goal (e.g., reducing a magnitude of a safety margin, identifying a local minimum safety margin, identifying a minimum safety margin). In some examples, operation 314 may determine a set of gain(s) to associate with an operating state (and/or a safety margin by virtue of the association of a safety margin with the operating state).

In some examples, operation 314 may comprise storing a set of gain(s) in a data structure in association with an operating state and/or safety margin and/or transmitting the set of gain(s) to one or more autonomous vehicles of an autonomous vehicle fleet. In some examples, operation 314 may comprise instructions to store, in a memory of the autonomous vehicle, a first set of gain(s) in association with an operating state; replace a first set of gain(s) stored at an autonomous vehicle with a second set of gain(s); and/or otherwise update and/or store a relational database stored at the autonomous vehicle.

In some examples, operations 306-314 may be repeated for a different (second) vehicle other than a (first) vehicle for which operations 302, 304, and/or 306-314 were conducted. In such a manner, the techniques may comprise determining safety margin(s) and/or gain(s) for a second vehicle that doesn't exist, isn't assembled, hasn't been tested, hasn't been operated and/or operated as extensively as the first vehicle, and/or wasn't the same vehicle as was used for operations 302 and 304. In some examples, the first vehicle may be operated extensively by driving hundreds, thousands, or millions of real-world (and/or simulated) miles. In some examples, verifying that an actual occurrence rate associated with real-world operation of the second vehicle will conform to the target occurrence rate (of operation 310) may comprise confirming that a measured frequency response and/or measured transfer function associated with the second vehicle matches (within a tolerance) the target model generated therefor. Accordingly, verifying that the actual occurrence rate will conform to the target occurrence rate may be verified without operating the second vehicle and/or without operating the second vehicle for as long as the first vehicle (e.g., on the order of tens of miles or less).

Example Autonomous Vehicle System Model

FIG. 5 illustrates a block diagram of an example model 500 of an autonomous vehicle system. In some examples, one or more of the blocks of the example model 500 may include one or more frequency responses and/or transfer functions of respective components of the autonomous vehicle system. In some examples, a frequency response and/or transfer function of a component may be determined based at least in part on a system identification analysis of the component and represented as a block. In some examples, at least some of the blocks may represent deterministic functions in addition to or instead of including a frequency response and/or transfer function, such as the blocks indicating "1/s", "Vx", "+", and/or the circular blocks indicating "+" and "1".

In some examples, the blocks indicating "1/s" may represent an integrator (e.g., a voltage integrator, a current integrator) and/or functionality thereof. In some examples, the blocks indicating "+" may sum the inputs thereto. The circular block may receive a first input as a positive value and/or without changing a sign of the first input (indicated by the "+" symbol) and a second input as a negative value thereof and/or by changing a sign thereof to be negative (indicated by the "−" symbol) and summing the (positive) first input and the (negated) second input. Put simply, the circular blocks may output a subtraction of the second input from the first input.

Starting on the left-hand side of FIG. 5, the example model 500 may receive a reference trajectory signal 502, $\dot{\Psi}_{CMD}$, (e.g., the lateral component of a reference trajectory, which may include a lateral position, steering angle, and/or steering rate). For example, the reference steering signal 502 may be received from a planner of the autonomous vehicle.

In some examples, an autonomous vehicle may comprise a first controller for controlling a front drive system of the vehicle (e.g., a front steering and/or front drive assembly associated with a front of the vehicle) and a second controller for controlling a rear of the vehicle (e.g., a rear steering and/or rear drive assembly associated with a front of the vehicle). Although a front and rear controller are described herein, it is understood that an autonomous vehicle may comprise any number of controllers (e.g., one controller for the front and back, one controller per wheel, one controller per motor). The depicted example includes two controllers.

The reference trajectory signal 502 may be provided, as input, to a feedforward control component of the controller. In the depicted example, this may include providing the reference trajectory signal 502 to a feedforward control component of a front controller, depicted as block $f_f$ and a feedforward control component of a rear controller, depicted as block $f_r$.

Depending on the type of controller, the controller may have any number of gains associated with tracking the reference trajectory. In the depicted example, each controller comprises two proportional gains—one associated with a yaw error 504 and another associated with a lateral error 506 of the actual trajectory accomplished by the vehicle.

A yaw error 504 may be determined at 508 based at least in part on determining a difference between the reference trajectory signal 502 and a measured yaw rate 510. The yaw error may be provided, as input, to a component of each controller associated with correcting the yaw error and associated with a first gain, depicted as blocks $K_{\Psi\_f}$ and $K_{\Psi\_r}$, respectively. In some examples, the gains, $K_{\Psi\_f}$ and $K_{\Psi\_r}$, respectively, may differ per controller (front/rear) and/or according to gains specified by a relational database in association with an operating state of the model.

A lateral error 506 may be determined at 512 based at least in part on a first component attributable to the yaw error 504 and a second component attributable to a lateral slip of the vehicle (i.e., lateral slip error 514). For example, determining the first component attributable to the yaw error may comprise determining a lateral displacement (at 516) based at least in part on the longitudinal velocity of the vehicle, $V_x$, and the yaw error 504. The second component attributable to lateral slip of the vehicle (lateral slip error 514) may be based at least in part on a measured slip 518. In some examples, the controller may have more control over the yaw error 504 than the lateral slip error 514. Accordingly, in some examples, the lateral error 506 may be adjusted to remove the lateral slip error 514 (which is why the measured slip is made negative at 520 before being summed at 512 with the lateral displacement). By removing the lateral slip error 514, the autonomous vehicle may avoid an overcorrection. In additional or alternate examples, the lateral sip error 514 may, instead, be unaccounted for or summed to the lateral displacement without negated first at 520 (e.g., to achieve amplify correction aggression).

The lateral error 506 may be provided, as input, to a component of each controller associated with correcting the lateral error and associated with a second gain, depicted as blocks $K_{y\_f}$ and $K_{y\_r}$, respectively. In some examples, the gains, $K_{y\_f}$ and $K_{y\_r}$, respectively, may differ per controller (front/rear) and/or according to gains specified by a relational database in association with an operating state of the model.

Outputs of the respective controller components may be summed and output to a respective steering actuator, respectively. For example, summing outputs of the front controller may result in a front steering command 526 provided as input to (front) actuator 528. Similarly, summing outputs of the rear controller may result in a rear steering command 530 provided as input to (rear) actuator 530. According to internal characteristics of the actuators, that may be modeled as a transfer function, actuator 528 may convert the front steering command 526 into a force 534 applied to at least a portion of a steering and/or driving assembly of the autonomous vehicle, and actuator 532 may similarly convert the rear steering command 530 into a force 536 applied to at least a portion of the steering and/or driving assembly. For example, force 534 and force 536 may be applied to a front steering rack and/or drive system and a rear steering rack and/or drive system, respectively, which may cause steering of wheel(s) of the autonomous vehicle and/or a rotation of the wheel(s).

Vehicle dynamics model 538 may include a transfer function modeling how the vehicle reacts, as a plant (e.g., the system being acted upon and/or creating the measured output), to the forces applied thereto. For example, vehicle dynamics model 538 may account for body roll, stopping force, aerodynamics, etc.

In some examples, measured yaw rate 510 and/or measured slip 518 may be measured by one or more sensors of the autonomous vehicle and/or may be determined based at least in part on pose data.

In some examples, a computing device may cause display, via a user interface, of a representation of the example model 500 like the block diagram depiction in FIG. 5. In some examples, the computing device may determine an error contribution associated with one or more of the components of the autonomous vehicle system. In some examples, the computing device may indicate a top n highest contributors to a magnitude of the error signal, $S_E$, where n is a positive integer. In some examples, if a component of an autonomous vehicle is substituted, e.g., a first actuator is exchanged for a second actuator, a first transfer function associated with the first actuator may be exchanged for a second transfer function associated with the second actuator.

In some examples, during assembly, repair, and/or inspection of an autonomous vehicle, a (test) transfer function may be determined for a component thereof and compared to a (target) transfer function stored in association with the example model 500. In such an example, the techniques may verify that the component conforms to a target transfer function that conforms to the target occurrence rate for which a safety margin is calculated. For example, if the test transfer function does not conform to the target transfer function, it may be possible that the component may cause an actual occurrence rate to increase and/or for the actual occurrence rate to be greater than the target occurrence rate.

In some examples, the techniques discussed herein may additionally or alternatively comprise receiving a target occurrence rate and/or a target safety margin and determining a target transfer function for a component and/or for the example model 500 as a whole in order to conform to the target occurrence rate and/or the target safety margin. In an additional or alternate example, the techniques may comprise determining a modification to make to a component to conform to a target occurrence rate and/or a target safety margin (e.g., reduce a delay of a steering rack by 5 milliseconds, increase gain associated with steering actuator, avoid longitudinal velocity associated with a harmonic frequency by increasing or decreasing longitudinal velocity).

Example System

Figure 6:
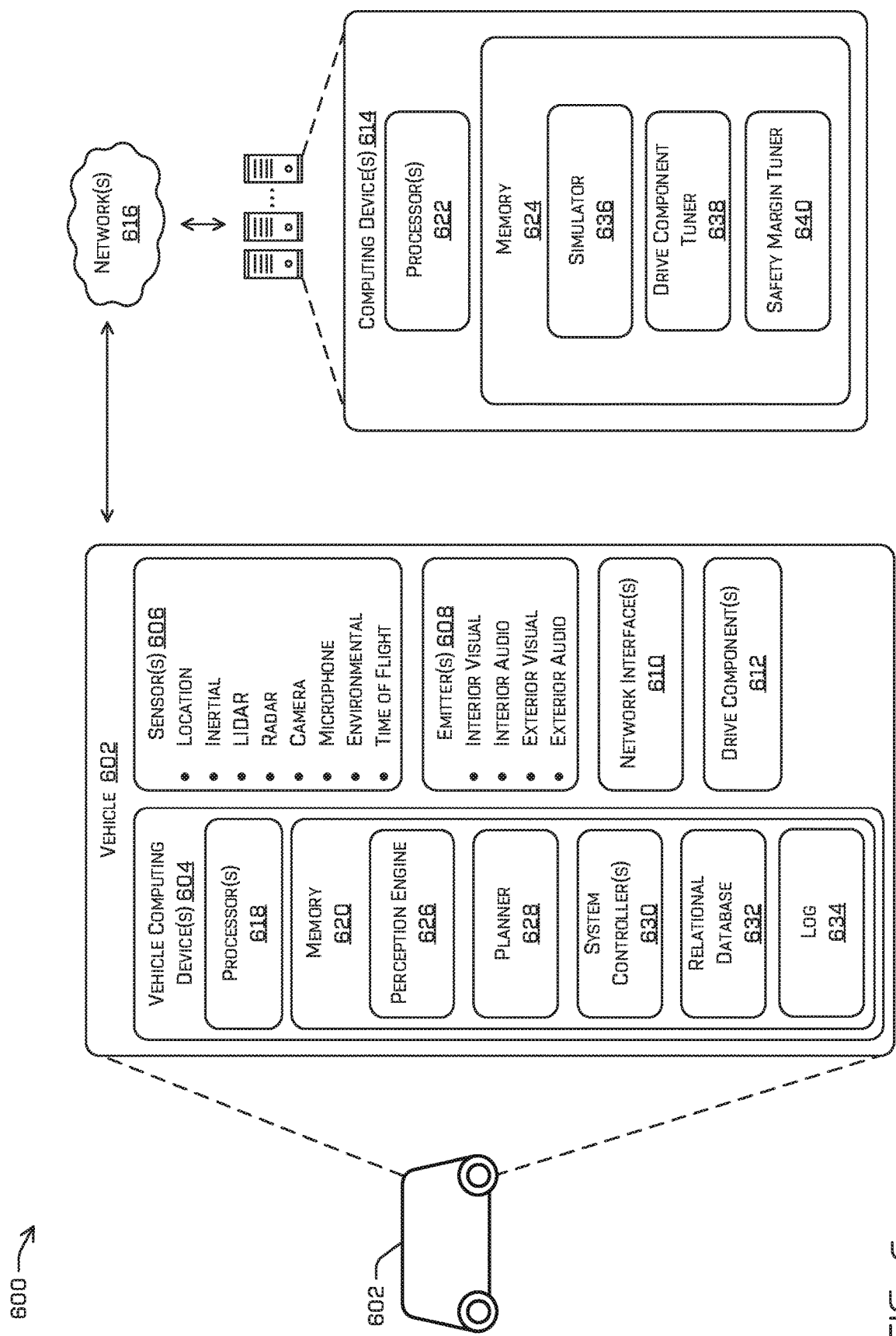
FIG. 6 illustrates a block diagram of an example system for determining a safety margin and/or for tuning vehicle component characteristics.

FIG. 6 illustrates a block diagram of an example system that may implement the techniques discussed herein. In some instances, the system 600 may include a vehicle 602, which may correspond to the autonomous vehicle 102 in FIG. 1. In some instances, the vehicle 602 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 602 may be a fully or partially autonomous vehicle having any other level or classification. Moreover, in some instances, the techniques described herein may be usable by non-autonomous vehicles as well. It is contemplated that the techniques discussed herein may apply to more than robotic control, such as for autonomous vehicles. For example, the techniques discussed herein may be applied to video games, manufacturing, augmented reality, etc.

The vehicle 602 may include vehicle computing device(s) 604, one or more sensor(s) 606, one or more emitters 608, one or more network interfaces 610, and/or one or more drive components 612. In some examples, vehicle computing device(s) 604 may represent computing device(s) 110, controller 118, and/or comparator 120.

In some instances, the sensor(s) 606 may include LIDAR sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, ToF, etc.), microphones, wheel encoders and/or other drive component sensor(s), environment sensors (e.g., temperature sensors, humidity sensors, light sensors, pressure sensors, etc.), etc. The sensor(s) 606 may include multiple instances of each of these or other types of sensors. The sensor(s) 606 may provide input to the vehicle computing device(s) 604.

The vehicle 602 may also include emitter(s) 608 for emitting light and/or sound, as described above. The emitter(s) 608 in this example may include interior audio and visual emitter(s) to communicate with passengers of the vehicle 602. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 608 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 602 may also include network interface(s) 610 that enable communication between the vehicle 602 and one or more other local or remote computing device(s). For instance, the network interface(s) 610 may facilitate communication with other local computing device(s) on the vehicle 602 and/or the drive component(s) 612. Also, the network interface (s) 610 may additionally or alternatively allow the vehicle to communicate with other nearby computing device(s) (e.g., other nearby vehicles, traffic signals, etc.). The network interface(s) 610 may additionally or alternatively enable the vehicle 602 to communicate with computing device(s) 614. In some examples, computing device(s) 614 may comprise one or more nodes of a distributed computing system (e.g., a cloud computing architecture).

The network interface(s) 610 may include physical and/or logical interfaces for connecting the vehicle computing device(s) 604 to another computing device or a network, such as network(s) 616. For example, the network interface(s) 610 may enable Wi-Fi-based communication such as via frequencies defined by the IEEE 800.11 standards, short range wireless frequencies such as Bluetooth®, cellular communication (e.g., 2G, 3G, 4G, 4G LTE, 6G, etc.) or any suitable wired or wireless communications protocol that enables the respective computing device to interface with the other computing device(s). In some instances, the vehicle computing device(s) 604 and/or the sensor(s) 606 may send sensor data, via the network(s) 616, to the computing device(s) 614 at a particular frequency, after a lapse of a predetermined period of time, in near real-time, etc.

In some instances, the vehicle 602 may include one or more drive components 612. In some instances, the vehicle 602 may have a single drive component 612. In some instances, the drive component(s) 612 may include one or more sensors to detect conditions of the drive component(s) 612 and/or the surroundings of the vehicle 602. By way of example and not limitation, the sensor(s) of the drive component(s) 612 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, LIDAR sensors, RADAR sensors, etc. Some sensors, such as the wheel encoders may be unique to the drive component(s) 612. In some cases, the sensor(s) on the drive component(s) 612 may overlap or supplement corresponding systems of the vehicle 602 (e.g., sensor(s) 606).

The drive component(s) 612 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 612 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 612. Furthermore, the drive component(s) 612 may also include one or more communication connection(s) that enable communication by the respective drive component with one or more other local or remote computing device(s). In some examples, drive component(s) 612 may comprise controller 118, comparator 120, and/or drive component(s) 130.

The vehicle computing device(s) 604 and/or computing device(s) 614 may include one or more processors 618 and memory 620 communicatively coupled with the one or more processors 618. Computing device(s) 614 may additionally or alternatively include processor(s) 622 and/or memory 624. The processor(s) 618 and/or 622 may be any suitable processor capable of executing instructions to process data and perform operations as described herein. By way of example and not limitation, the processor(s) 618 and/or 622 may comprise one or more central processing units (CPUs), graphics processing units (GPUs), integrated circuits (e.g., application-specific integrated circuits (ASICs), etc.), gate arrays (e.g., field-programmable gate arrays (FPGAs), etc.), and/or any other device or portion of a device that processes electronic data to transform that electronic data into other electronic data that may be stored in registers and/or memory.

Memory 620 and/or memory 624 may be examples of non-transitory computer-readable media. The memory 620 and/or memory 624 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 620 and/or memory 624 may store a perception engine 626, a planner 628, system controller(s) 630, relational database 632, and/or log 634. In some examples, memory 624 may store perception engine 626, planner 628, system controller(s) 630, and/or relational database 632 for simulating operation of vehicle 602. In some examples, the vehicle computing device(s) 604 and/or the computing device(s) 614 may populate log 634 with reference trajector(ies) generated by planner 628, based at least in part on operation of the vehicle 602 and/or based at least in part on simulation of operation of the vehicle 602 by a simulator 636 stored on memory 620 and executed by processor(s) 622. In some examples, simulator 636 may additionally or alternatively be stored at memory 620.

Perception engine 626 may represent perception engine 112, planner 628 may represent planner 114, and/or system controller(s) 630 may represent controller 118 and/or comparator 120. In some instances, perception engine 626 may comprise a primary perception system, a secondary perception system, a prediction system, and/or a localization system. The memory 620 and/or memory 624 may additionally or alternatively store a mapping system, a ride management system, etc. Although perception engine 626, planner 628, and system controller(s) 630 are illustrated as being stored in memory 620, perception engine 626, planner 628, and/or system controller(s) 630 may be stored in memory 624 and/or may include processor-executable instructions, machine-learned model(s), hardware, and/or some combination thereof (e.g., an FPGA).

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

Memory 620 and/or memory 624 may additionally or alternatively store one or more system controller(s) 630 (which may additionally or alternatively be implemented as hardware), which may be configured to control steering, propulsion, braking, safety, emitters, communication, and other systems of the vehicle 602 and/or a simulated vehicle in a synthetic environment generated by simulator 636. These system controller(s) 630 may communicate with and/or control corresponding systems of the drive component(s) 612 and/or other components of the vehicle 602. For example, the planner 628 may generate instructions, such as a reference trajectory, based at least in part on perception data generated by the perception engine 626 and transmit the instructions to the system controller(s) 630, which may control operation of the vehicle 602 based at least in part on the instructions. In some examples, the system controller(s) 630 may operate based at least in part on a set of gain(s) associated therewith.

In some examples, memory 620 and/or memory 624 may store relational database 632. Relational database 632 may comprise a safety margin 124 and/or operating state 126. In some examples, the relational database 632 may associate a safety margin, operating state, model of the autonomous vehicle, and/or a set of gain(s), as determined according to any of the techniques discussed herein. In some examples, the relational database 632 stored in memory 620 may be different than a relational database stored memory 624. For example, a relational database stored in memory 624 may comprise models associated with safety margins, whereas a relational database stored in memory 620 may not store the models, although it is also contemplated that such differentiation is not necessary.

In some examples, the memory 624 may additionally or alternatively store a simulator 636, drive component tuner 638, and/or safety margin tuner 640, any of which may be implemented as processor-executable instructions, machine-learned model(s), hardware, and/or some combination thereof (e.g., an FPGA). In some examples, drive component tuner 638 may determine gain(s) associated with an operating state, safety margin, and/or occurrence rate that reduces a magnitude of a safety margin while maintaining a stable system (e.g., not causing control of the vehicle to be underdamped or overdamped). In some examples, the safety margin tuner 640 may generate a model (in association with an operating state in some examples), determine a safety margin associated with the model and/or a reference trajectory signal, and/or cause display of a user interface depicting the model(s), safety margin(s), and/or error contribution associated with a component of a model. In additional or alternate examples, the simulator 636, drive component tuner 638, and/or safety margin tuner 640 may be stored at memory 620 and/or executed by processor(s) 618.

It should be noted that while FIG. 6 is illustrated as a distributed system, in alternative examples, components of the vehicle 602 may be associated with the computing device(s) 614 and/or components of the computing device(s) 614 may be associated with the vehicle 602. That is, the vehicle 602 may perform one or more of the functions associated with the computing device(s) 614, and vice versa.

Example Clauses

A. A method comprising: receiving trajectory data; determining a first spectrum associated with the trajectory data indicative of frequencies of one or more reference trajectories; generating a model of an autonomous vehicle system; determining, based at least in part on the model and the first spectrum, a second spectrum associated with an error signal; receiving an occurrence rate indicating a number of times that the autonomous vehicle system is likely to violate a safety margin within a time period; and determining, based at least in part on the occurrence rate and the error signal, the safety margin for limiting a reference trajectory signal generated by the autonomous vehicle system.

B. The method of paragraph A, wherein determining the safety margin further comprises solving a level-crossing model based at least in part on the occurrence rate, the error signal, and a variance associated with the error signal.

C. The method of either paragraph A or B, further comprising: determining, based at least in part on the safety margin, a corridor within which the autonomous vehicle system is to operate; determining a trajectory within the corridor for controlling operation of the autonomous vehicle system; and controlling the autonomous vehicle system based at least in part on the trajectory.

D. The method of any one of paragraphs A-C, wherein: the model is a first model associated with a first set of operating conditions; the safety margin is a first safety margin associated with the first set of operating conditions and a first set of operating parameters; and the method further comprises: receiving, from one or more sensors of the autonomous vehicle system, sensor data; determining, based at least in part on the sensor data, at least one of a second set of operating conditions or a second set of operating parameters; identifying a second safety margin associated with at least one of the second set of operating conditions or the second set of operating parameters; and determining, based at least in part on the second safety margin, a trajectory for controlling operation of the autonomous vehicle system.

E. The method of any one of paragraphs A-D, wherein the safety margin is a first safety margin, the error signal is a first error signal, and the model is a first model associated with a first gain of a component of the autonomous vehicle system, and the method further comprises: generating a second model based at least in part on a second gain associated with the component; determining a second error signal based at least in part on the second model and the first spectrum; determining, based at least in part on the second error signal, a second safety margin; determining that the second safety margin is smaller than the first safety margin; and transmitting an instruction to one or more autonomous vehicle systems to operate the component based at least in part on the second gain instead of the first gain.

F. The method of any one of paragraphs A-E, wherein the safety margin is a first safety margin, the error signal is a first error signal, and the model is a first model associated with a first autonomous vehicle system, and the method further comprises: determining a second model associated with a second autonomous vehicle system, wherein the second autonomous vehicle system is different than the first autonomous vehicle system; determining a second error signal based at least in part on the second model and the first spectrum; and determining, based at least in part on the second error signal, a second safety margin.

G. The method of any one of paragraphs A-F, wherein: generating the model is based at least in part on one or more operating conditions, wherein the one or more operating conditions comprise at least one of: a number of passengers in the autonomous vehicle system, a weight of the autonomous vehicle system, a grade of a surface upon which the autonomous vehicle system is operating, a bank of the surface, a kinematic coefficient associated with the surface, a failure condition associated with the autonomous vehicle system, a transfer function associated with a first component of the autonomous vehicle system, an environmental condition, a path curvature, or a gain associated with the first component or a second component; and determining the safety margin is based at least in part on evaluating the model at one or more operating parameters, wherein the one or more operating parameters comprise at least one of: a longitudinal velocity of the autonomous vehicle system, a longitudinal acceleration of the autonomous vehicle system, a lateral velocity of the autonomous vehicle system, a lateral acceleration of the autonomous vehicle system, or yaw rate of the autonomous vehicle system.

H. A system comprising: one or more processors; a memory storing processor-executable instructions that, when executed by the one or more processors, cause the system to perform operations comprising: receiving trajectory data; converting, as a first spectrum, the trajectory data into an s-domain or a frequency domain; generating a model of a vehicle; determining, based at least in part on the model and the first spectrum, an error signal; receiving an occurrence rate; and determining, based at least in part on the occurrence rate and the error signal, a safety margin.

I. The system of paragraph H, wherein: determining the first spectrum comprises determining a first power spectral density of a lateral component of the trajectory data; and determining the error signal comprises determining a second power spectral density associated with the error signal based at least in part on the model and the first spectrum.

J. The system of either paragraph H or I, wherein determining the safety margin further comprises solving a level-crossing model based at least in part on the occurrence rate, the error signal, and a variance associated with the error signal.

K. The system of any one of paragraphs H-J, wherein the safety margin is a first safety margin, the error signal is a first error signal, and the model is a first model associated with a first gain of a component of the vehicle, and the operations further comprise: generating a second model based at least in part on a second gain associated with the component; determining a second error signal based at least in part on the second model and the first spectrum; determining, based at least in part on the second error signal, a second safety margin; determining that the second safety margin is smaller than the first safety margin; and transmitting an instruction to one or more vehicles to operate the component based at least in part on the second gain.

L. The system of any one of paragraphs H-K, wherein the safety margin is a first safety margin, the error signal is a first error signal, and the model is a first model associated with a first vehicle, and the method further comprises: determining a second model associated with a second vehicle, wherein the second vehicle is different than the first vehicle; determining a second error signal based at least in part on the second model and the first spectrum; and determining, based at least in part on the second error signal, a second safety margin.

M. The system of any one of paragraphs H-L, wherein: the model is a first model associated with a first set of operating conditions; the safety margin is a first safety margin associated with the first set of operating conditions and a first set of operating parameters; and the operations further comprise: receiving, from one or more sensors of the vehicle, sensor data; determining, based at least in part on the sensor data, at least one of a second set of operating conditions or a second set of operating parameters; identifying a second safety margin associated with at least one of the second set of operating conditions or the second set of operating parameters; and determining, based at least in part on the second safety margin, a trajectory for controlling operation of the vehicle.

N. A non-transitory computer-readable medium comprising processor-executable instructions that, when executed by one or more processors, cause the one or more processors to perform operations comprising: receiving a trajectory data; determining a first spectrum associated with the trajectory data; generating a model of a vehicle; determining, based at least in part on the model and the first spectrum, an error signal; receiving an occurrence rate; and determining, based at least in part on the occurrence rate and the error signal, a safety margin.

O. The non-transitory computer-readable medium of paragraph N, wherein determining the safety margin further comprises solving a level-crossing model based at least in part on the occurrence rate, the error signal, and a variance associated with the error signal.

P. The non-transitory computer-readable medium of either paragraph N or O, wherein: the safety margin is a first safety margin associated with a first set of values associated with operating parameters and the model is a first model; the operations further comprise: determining a second safety margin associated with a second set of values associated with the operating parameters based at least in part on generating a second model associated with the second set of values; and the operating parameters comprise at least one of: a longitudinal velocity of the vehicle, a longitudinal acceleration of the vehicle, a lateral velocity of the vehicle, or a lateral acceleration of the vehicle.

Q. The non-transitory computer-readable medium of any one of paragraphs N-P, wherein: determining the first spectrum is based at least in part on determining a power spectral density of a lateral component of the trajectory data; and determining the safety margin further comprises solving a level-crossing model that is based at least in part on the error signal and a variance associated with the error signal.

R. The non-transitory computer-readable medium of any one of paragraphs N-Q, wherein: the operations further comprise receiving an occurrence rate; and determining the safety margin further comprises solving a level-crossing model based at least in part on the occurrence rate, the error signal, and a variance associated with the error signal.

S. The non-transitory computer-readable medium of any one of paragraphs N-R, wherein the safety margin is a first safety margin, the error signal is a first error signal, and the model is a first model associated with a first gain of a component of the vehicle, and the method further comprises: generating a second model based at least in part on a second gain associated with the component; determining a second error signal based at least in part on the second model and the first spectrum; determining, based at least in part on the second error signal, a second safety margin; determining that the second safety margin is smaller than the first safety margin; or transmitting an instruction to one or more vehicles to operate the component based at least in part on the second gain.

T. The non-transitory computer-readable medium of any one of paragraphs N-S, wherein the safety margin is a first safety margin, the error signal is a first error signal, and the model is a first model associated with a first vehicle, and the method further comprises: determining a second model associated with a second vehicle, wherein the second vehicle is different than the first vehicle; determining a second error signal based at least in part on the second model and the first spectrum; and determining, based at least in part on the second error signal, a second safety margin.

U. An autonomous vehicle comprising the system as any one of paragraphs H-M recites.

V. An autonomous vehicle, system, and/or device comprising: one or more processors; and a memory storing processor-executable instructions that, when executed by the one or more processors, cause the system to perform operations as any one of paragraphs A-G recites.

W. A non-transitory computer-readable medium storing processor-executable instructions that, when executed, cause one or more processors to perform operations comprising the operations as any one of paragraphs A-G recites.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising: receiving, from a vehicle, trajectory data comprising one or more reference trajectories; determining a first spectrum associated with the trajectory data indicative of frequencies of the one or more reference trajectories; generating a model of a component of an autonomous vehicle system; determining, based at least in part on the model and the first spectrum, a second spectrum associated with an error; receiving an occurrence rate indicative of the occurrence of an event and a time period defined by one or more of an amount of time between successive events or an amount of time prior to the first occurrence of the event; determining a safety margin based at least in part on the error and the event occurring at a rate less than or equal to the occurrence rate; transmitting the safety margin to the vehicle or another vehicle to cause the vehicle or the other vehicle to generate a trajectory; and controlling the vehicle or the other vehicle based at least in part on the safety margin.

2. The method of claim 1, wherein determining the safety margin further comprises solving a level-crossing model based at least in part on the occurrence rate, the error, and a variance associated with the error.

3. The method of claim 1, further comprising: determining, based at least in part on the safety margin, a corridor within which the autonomous vehicle system is to operate; determining a trajectory within the corridor for controlling operation of the autonomous vehicle system; and controlling the autonomous vehicle system based at least in part on the trajectory.

4. The method of claim 1, wherein: the model is a first model associated with a first set of operating conditions; the safety margin is a first safety margin associated with the first set of operating conditions and a first set of operating parameters; and the method further comprises: receiving, from one or more sensors of the autonomous vehicle system, sensor data; determining, based at least in part on the sensor data, at least one of a second set of operating conditions or a second set of operating parameters; identifying a second safety margin associated with at least one of the second set of operating conditions or the second set of operating parameters; and determining, based at least in part on the second safety margin, a trajectory for controlling operation of the autonomous vehicle system.

5. The method of claim 1, wherein the vehicle comprises one or more of a vehicle traversing an environment or a simulated vehicle simulated on a computing device, the safety margin is a first safety margin, the error is a first error, and the model is a first model associated with a first gain of the component of the autonomous vehicle system, and the method further comprises: generating a second model based at least in part on a second gain associated with the component; determining a second error based at least in part on the second model and the first spectrum; determining, based at least in part on the second error, a second safety margin; determining that the second safety margin is smaller than the first safety margin; and transmitting an instruction to one or more autonomous vehicle systems to operate the component based at least in part on the second gain instead of the first gain.

6. The method of claim 1, wherein the safety margin is a first safety margin, the error is a first error, and the model is a first model associated with a first autonomous vehicle system, and the method further comprises: determining a second model associated with a second autonomous vehicle system, wherein the second autonomous vehicle system is different than the first autonomous vehicle system; determining a second error based at least in part on the second model and the first spectrum; and determining, based at least in part on the second error, a second safety margin.

7. The method of claim 1, wherein: generating the model is based at least in part on one or more operating conditions, wherein the one or more operating conditions comprise at least one of: a number of passengers in the autonomous vehicle system, a weight of the autonomous vehicle system, a grade of a surface upon which the autonomous vehicle system is operating, a bank of the surface, a kinematic coefficient associated with the surface, a failure condition associated with the autonomous vehicle system, a transfer function associated with a first component of the autonomous vehicle system, an environmental condition, a path curvature, or a gain associated with the first component or a second component; and determining the safety margin is based at least in part on evaluating the model at one or more operating parameters, wherein the one or more operating parameters comprise at least one of: a longitudinal velocity of the autonomous vehicle system, a longitudinal acceleration of the autonomous vehicle system, a lateral velocity of the autonomous vehicle system, a lateral acceleration of the autonomous vehicle system, or yaw rate of the autonomous vehicle system.

8. A system comprising: one or more processors; and a memory storing processor-executable instructions that, when executed by the one or more processors, cause the system to perform operations comprising: receiving trajectory data from a vehicle; converting, as a first spectrum, the trajectory data into an s-domain or a frequency domain; generating a model of the vehicle; determining, based at least in part on the model and the first spectrum, an error; and determining, based at least in part on an occurrence rate and the error, a safety margin, wherein the safety margin is configured to constrain a trajectory generated by the vehicle for controlling the vehicle.

9. The system of claim 8, wherein: determining the first spectrum comprises determining a first power spectral density of a lateral component of the trajectory data; and determining the error comprises determining a second power spectral density associated with the error based at least in part on the model and the first spectrum.

10. The system of claim 8, wherein determining the safety margin further comprises solving a level-crossing model based at least in part on the occurrence rate, the error, and a variance associated with the error.

11. The system of claim 8, wherein the vehicle is a simulated vehicle, the safety margin is a first safety margin, the error is a first error, and the model is a first model associated with a first gain of the component of the vehicle, and the operations further comprise: generating a second model based at least in part on a second gain associated with the component; determining a second error based at least in part on the second model and the first spectrum; determining, based at least in part on the second error, a second safety margin; determining that the second safety margin is smaller than the first safety margin; and transmitting an instruction to one or more vehicles to operate the component based at least in part on the second gain.

12. The system of claim 8, wherein the safety margin is a first safety margin, the error is a first error, and the model is a first model associated with a first vehicle, and the operations further comprise: determining a second model associated with a second vehicle, wherein the second vehicle is different than the first vehicle; determining a second error based at least in part on the second model and the first spectrum; and determining, based at least in part on the second error, a second safety margin.

13. The system of claim 8, wherein: the model is a first model associated with a first set of operating conditions; the safety margin is a first safety margin associated with the first set of operating conditions and a first set of operating parameters; and the operations further comprise: receiving, from one or more sensors of the vehicle, sensor data; determining, based at least in part on the sensor data, at least one of a second set of operating conditions or a second set of operating parameters; identifying a second safety margin associated with at least one of the second set of operating conditions or the second set of operating parameters; and determining, based at least in part on the second safety margin, a trajectory for controlling operation of the vehicle.

14. A non-transitory computer-readable medium comprising processor-executable instructions that, when executed by one or more processors, cause the one or more processors to perform operations comprising: receiving a trajectory data; determining a first spectrum associated with the trajectory data; generating a model of a vehicle; determining, based at least in part on the model and the first spectrum, an error; receiving an occurrence rate; and determining, based at least in part on the occurrence rate and the error, a safety margin for controlling the vehicle.

15. The non-transitory computer-readable medium of claim 14, wherein determining the safety margin further comprises solving a level-crossing model based at least in part on the occurrence rate, the error, and a variance associated with the error.

16. The non-transitory computer-readable medium of claim 14, wherein: the safety margin is a first safety margin associated with a first set of values associated with operating parameters and the model is a first model; the operations further comprise: determining a second safety margin associated with a second set of values associated with the operating parameters based at least in part on generating a second model associated with the second set of values; and the operating parameters comprise at least one of: a longitudinal velocity of the vehicle, a longitudinal acceleration of the vehicle, a lateral velocity of the vehicle, or a lateral acceleration of the vehicle.

17. The non-transitory computer-readable medium of claim 14, wherein: determining the first spectrum is based at least in part on determining a power spectral density of a lateral component of the trajectory data; and determining the safety margin further comprises solving a level-crossing model that is based at least in part on the error and a variance associated with the error.

18. The non-transitory computer-readable medium of claim 14, wherein: the operations further comprise receiving an occurrence rate; and determining the safety margin further comprises solving a level-crossing model based at least in part on the occurrence rate, the error, and a variance associated with the error.

19. The non-transitory computer-readable medium of claim 14, wherein the safety margin is a first safety margin, the error is a first error, and the model is a first model associated with a first gain of a component of the vehicle, and the operations further comprise: generating a second model based at least in part on a second gain associated with the component; determining a second error based at least in part on the second model and the first spectrum; determining, based at least in part on the second error, a second safety margin; determining that the second safety margin is smaller than the first safety margin; or transmitting an instruction to one or more vehicles to operate the component based at least in part on the second gain.

20. The non-transitory computer-readable medium of claim 14, wherein the safety margin is a first safety margin, the error is a first error, and the model is a first model associated with a first vehicle, and the operations further comprise: determining a second model associated with a second vehicle, wherein the second vehicle is different than the first vehicle; determining a second error based at least in part on the second model and the first spectrum; and determining, based at least in part on the second error, a second safety margin.

* * * * *